US009092111B2

(12) United States Patent
Cifra et al.

(10) Patent No.: US 9,092,111 B2
(45) Date of Patent: Jul. 28, 2015

(54) CAPTURING INFORMATION ON A RENDERED USER INTERFACE INCLUDING USER ACTIVATABLE CONTENT

(75) Inventors: Patricia Narvaez Cifra, Austin, TX (US); Timothy Pressler Clark, Rochester, MN (US); Gregory Richard Hintermeister, Rochester, MN (US); Heidi Louise Saufferer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 819 days.

(21) Appl. No.: 12/843,863

(22) Filed: Jul. 26, 2010

(65) Prior Publication Data

US 2012/0023402 A1 Jan. 26, 2012

(51) Int. Cl.
G06F 3/00 (2006.01)
G06F 3/048 (2013.01)
G06F 3/0482 (2013.01)
G06F 9/44 (2006.01)
G06F 9/45 (2006.01)
G06F 11/263 (2006.01)
G06F 11/34 (2006.01)
(Continued)

(52) U.S. Cl.
CPC .......... G06F 3/04812 (2013.01); G06F 3/0481 (2013.01); G06F 3/0488 (2013.01); G06F 9/4443 (2013.01)

(58) Field of Classification Search
CPC ... G06F 3/0482; G06F 9/4443; G06F 11/263; G06F 11/3438; G06F 11/3457; G06F 11/3676; G06F 11/3696

USPC ........ 703/17, 21, 22; 715/209, 234, 704, 762, 715/766, 768, 810; 717/124, 134, 135
See application file for complete search history.

(56) References Cited

U.S. PATENT DOCUMENTS 5,321,838 A * 6/1994 Hensley et al. ............... 717/125
5,781,720 A * 7/1998 Parker et al. ............... 714/38.11
(Continued)

OTHER PUBLICATIONS

"Adobe Photoshop 6.0 User Guide," 2000, see, generally, chapter 8.*
(Continued)

*Primary Examiner* — Eric J Bycer
(74) *Attorney, Agent, or Firm* — David W. Victor; Konrad, Raynes, Davda and Victor LLP (57) ABSTRACT

Provided are a computer program product, method, and system for capturing information on a rendered user interface including user activatable content. A user interface is executed on the computer system. An initial representation is generated of a rendered user interface. A determination is made of locations rendered in the user interface associated with user activatable content, wherein user activatable content is rendered in response to user selection of a location in the user interface associated with the user activatable content. For each determined location, content is captured from the activatable content rendered in response to the user selecting the determined location to create a captured content object having the captured content. The captured content objects and the initial representation are stored. The initial representation and the captured content objects are processed to generate output to render the initial representation of the user interface and the captured content from the captured content objects.

22 Claims, 8 Drawing Sheets

(51) Int. Cl.

| | |
|---|---|
| *G06F 11/36* | (2006.01) |
| *G06F 13/10* | (2006.01) |
| *G06F 13/12* | (2006.01) |
| *G06F 17/00* | (2006.01) |
| *G06F 17/20* | (2006.01) |
| *G06F 17/21* | (2006.01) |
| *G06F 17/22* | (2006.01) |
| *G06F 17/24* | (2006.01) |
| *G06F 17/25* | (2006.01) |
| *G06F 17/26* | (2006.01) |
| *G06F 17/27* | (2006.01) |
| *G06F 17/28* | (2006.01) |
| *G06F 7/62* | (2006.01) |
| *G06F 3/0481* | (2013.01) |
| *G06F 3/0488* | (2013.01) |

(56) References Cited

U.S. PATENT DOCUMENTS

| | | | | |
|---|---|---|---|---|
| 5,844,557 | A * | 12/1998 | Shively, II | 715/846 |
| 5,926,638 | A * | 7/1999 | Inoue | 717/125 |
| 6,184,880 | B1 | 2/2001 | Okada | 715/704 |
| 6,308,146 | B1 * | 10/2001 | La Cascia et al. | 703/22 |
| 6,766,475 | B2 * | 7/2004 | Segal et al. | 714/38.1 |
| 6,854,089 | B1 * | 2/2005 | Santee et al. | 715/783 |
| 7,099,893 | B2 * | 8/2006 | Bischof et al. | 717/124 |
| 7,290,245 | B2 * | 10/2007 | Skjolsvold | 717/125 |
| 7,478,182 | B2 * | 1/2009 | Schweig | 710/73 |
| 7,653,721 | B1 * | 1/2010 | Romanov et al. | 709/224 |
| 2002/0161794 | A1 * | 10/2002 | Dutta et al. | 707/500 |
| 2003/0167422 | A1 * | 9/2003 | Morrison et al. | 714/38 |
| 2004/0041827 | A1 * | 3/2004 | Bischof et al. | 345/704 |
| 2004/0205514 | A1 | 10/2004 | Sommerer et al. | |
| 2004/0230954 | A1 * | 11/2004 | Dandoy | 717/124 |
| 2004/0250214 | A1 * | 12/2004 | McGlinchey et al. | 715/762 |
| 2005/0132333 | A1 * | 6/2005 | Neumann et al. | 717/124 |
| 2005/0257198 | A1 * | 11/2005 | Stienhans et al. | 717/124 |
| 2007/0101394 | A1 * | 5/2007 | Fu et al. | 725/134 |
| 2007/0220347 | A1 * | 9/2007 | Kirtkow et al. | 714/38 |
| 2007/0245227 | A1 | 10/2007 | Hyland et al. | |
| 2008/0072154 | A1 * | 3/2008 | Michaelis et al. | 715/727 |
| 2008/0155458 | A1 | 6/2008 | Fagans et al. | |
| 2008/0256458 | A1 | 10/2008 | Aldred et al. | |
| 2008/0294985 | A1 * | 11/2008 | Milov | 715/704 |
| 2008/0313603 | A1 * | 12/2008 | Denkel | 717/106 |
| 2009/0007071 | A1 * | 1/2009 | Peipelman et al. | 717/124 |
| 2009/0100367 | A1 | 4/2009 | Dargahi et al. | |
| 2009/0113290 | A1 | 4/2009 | Boegelund et al. | |
| 2009/0196497 | A1 * | 8/2009 | Pankratius | 382/165 |
| 2009/0204926 | A1 | 8/2009 | Cochrane | |
| 2009/0210749 | A1 * | 8/2009 | Hayutin | 714/38 |
| 2009/0300481 | A1 | 12/2009 | Imai | |
| 2010/0211893 | A1 * | 8/2010 | Fanning et al. | 715/760 |
| 2011/0055815 | A1 * | 3/2011 | Squillace | 717/125 |
| 2011/0099491 | A1 * | 4/2011 | Abraham et al. | 715/764 |
| 2011/0131551 | A1 * | 6/2011 | Amichai et al. | 717/125 |

OTHER PUBLICATIONS

"JAWS for Windows Quick Start Guide," Freedom Scientific BLV Group, LLC, May 2006.*

IBM (Jun. 14, 2007). Mouse-over "Cloud" Contents Capture. p. 1-3. IP.com No. 1PCOM000153907D.

IBM (Nov. 14, 2006). Communicable, Savable, Navigational Markup and Annotation for Scrollbars within Webpages, Word Processing Applications and Other Environments. p. 1-3. IP.com. No. 1PCOM000143186D.

IBM (Apr. 1, 2009). Tool to help sofhrvare developers create internationalized programs more rapidly, accurately and cheaply. p. 1-8. IP.com No. 1PCOM000181417D.

Patten, M."Getting Started with Screen Capture Using Windows Media Encoder", Dec. 2006, 10 pgs.

Adobe Captivate 3 User Guide, 2007, pp. 1-200.

Adobe Captivate 3 User Guide, 2007, pp. 201-408.

\* cited by examiner

Captured Content Object

CAPTURING INFORMATION ON A RENDERED USER INTERFACE INCLUDING USER ACTIVATABLE CONTENT

BACKGROUND OF THE INVENTION

1. Field of the Invention

The present invention relates to a method, system, and computer program product for capturing information on a rendered user interface including user activatable content.

2. Description of the Related Art

A user interface for an application executing in a computer may provide an initial view of content and graphical controls the user may select, and also provide hidden content that the user activates by interacting with the user interface regions with a user input device, such as a mouse and keyboard. Such hidden content that is activated in response to user interaction may comprise graphics, pictures, schematics, and animations. Further, the user interface may provide several touchpoints where hover help, context menus, and other popup information can be viewed. Examples include two dimensional hardware schematics that can have fly-over text, tips, and hotspots where components can be selected and actions performed and three dimensional virtual worlds where objects have status, actions, and other information available when that object is moused-over or selected.

If a screen capture is taken, then much of the hidden content, content only displayed in response to user interaction, and animation is not captured. Thus, there is a need in the art for improved techniques for capturing information on a user interface.

SUMMARY

Provided are a computer program product, method, and system for capturing information on a rendered user interface including user activatable content. A user interface is executed on the computer system. An initial representation is generated of a rendered user interface. A determination is made of locations rendered in the user interface associated with user activatable content, wherein user activatable content is rendered in response to user selection of a location in the user interface associated with the user activatable content. For each determined location, content is captured from the activatable content rendered in response to the user selecting the determined location to create a captured content object having the captured content. The captured content objects and the initial representation are stored. The initial representation and the captured content objects are processed to generate output to render the initial representation of the user interface and the captured content from the captured content objects.

DETAILED DESCRIPTION

Described embodiments provide a user interface capture tool that may be deployed with an application to capture information on a user interface for the application. The user interface capture tool may capture an initial representation of the user interface before user interaction and activatable content that is rendered in response to the user interacting with regions, e.g., touchpoints, on the rendered user interface with various input, e.g., mouse and keyboard, commands. The captured initial representation and activatable content may be saved in a file or object, or in a set of files or objects, and made available to allow later rendering of the initial representation as well as activatable content for viewing, troubleshooting, and support.

Figure 1:
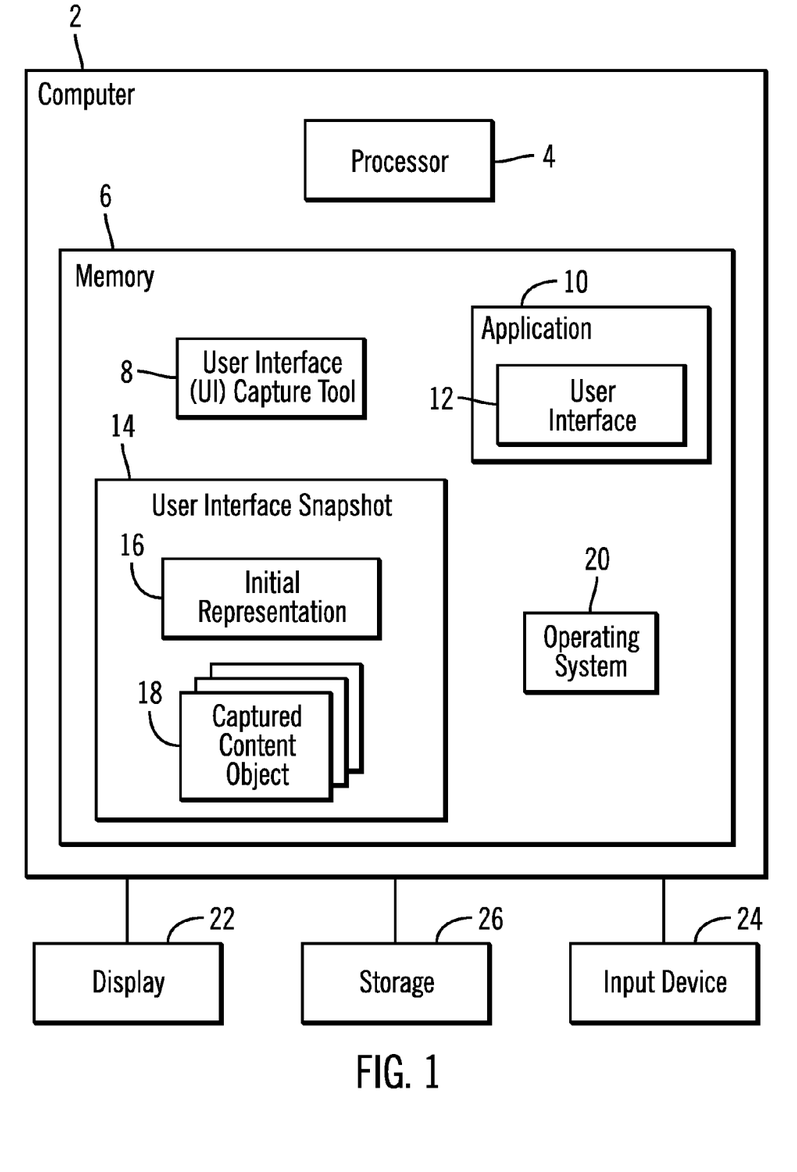
FIG. 1 illustrates an embodiment of a computing environment.

FIG. 1 illustrates an embodiment of a computing environment. A computer 2 includes a processor 4 and a memory 6 including a user interface (UI) capture tool 8, an application 10 having a user interface 12, and a user interface (UI) snapshot 14. The user interface 12 provides a user interface to the application 10 to enable a user of the computer 2 to control the application 10 and render and display information and status gathered by the application 10. The UI capture tool 8 processes and intercepts events from the user interface 12 to generate the UI snapshot 14 that includes an initial representation 16 of the user interface 12, such as when the user interface 12 is initially invoked and presented to the user, and one or more captured content objects 18 including captured content that is produced by the user interface 12 in response to the user interacting with the user interface 12. The computer 2 further includes an operating system 20 to manage the execution of the programs, including programs 8, 10, and 12 in the memory 4.

A display 22 renders output from the programs executing in the computer 2 and an input device 24 is used to provide user input to the processor 2, and may include a keyboard, mouse, pen-stylus, microphone, touch sensitive display screen, or any other activation or input mechanism known in the art. A storage 26 provides non-volatile storage of programs 8, 10, 16 and data, such as the user interface snapshot 14.

The storage 26 may comprise one or more storage devices, such as a solid state storage device comprised of solid state electronics, such as a EEPROM (Electrically Erasable Programmable Read-Only Memory), flash memory, flash disk, storage-class memory (SCM), etc., magnetic storage disk, optical disk, tape, etc. The memory 6 may comprise one or more volatile or non-volatile memory devices. In the embodiment of FIG. 1, the UI capture tool 8 is implemented as a software program loaded into the memory 6 and executed by the processor 4. In an alternative embodiment, the UI capture tool 8 may be implemented with hardware logic, such as an Application Specific Integrated Circuit (ASIC), or as a programmable processor executing code in a computer readable storage medium.

Figure 2:
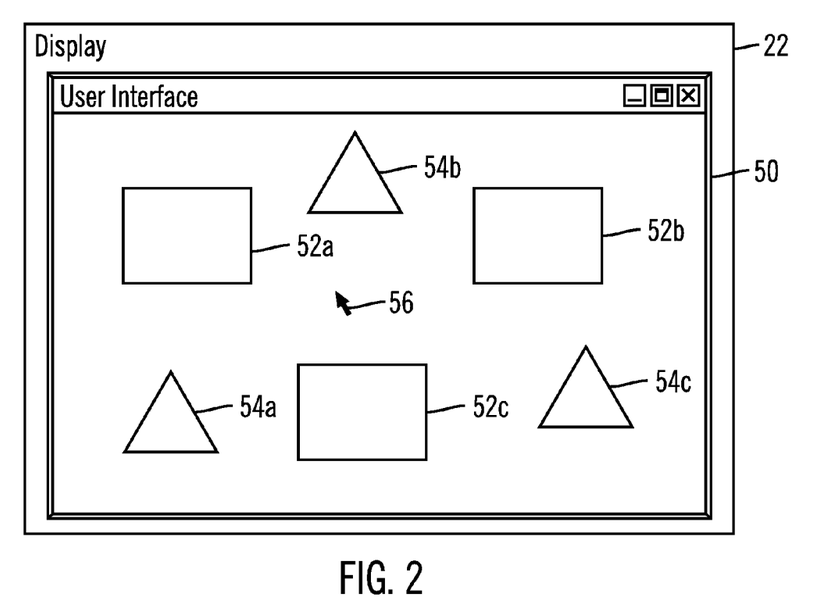
FIGS. 2, 3, and 4 illustrate embodiments of a rendered user interface.

FIG. 2 illustrates an embodiment of an initial state of a rendered user interface 50 displayed by the computer 2 on the display 22 to enable the user to interact with the application 10. The user interface 50 includes static components 52a, 52b, 52c, represented as squares in the illustration, that comprise text, images, sound, moving images, icons, graphical user controls, menus providing access to menu items comprising further menus or graphical controls of the user interface 12, etc., that are rendered in the initial state of the user interface 50, without requiring user interaction or activation. The rendered user interface 50 further includes user activatable content 54a, 54b, 54c regions, represented as triangles in the illustration. User activatable content is rendered in response to the user interacting with the region 54a, 54b, 54c of the rendered user interface 50 associated with the activatable content. Activatable content may comprises text, images, sound, moving images, icons, graphical user controls, three dimensional animations, menus providing access to menu items comprising further menus or graphical controls of the user interface 12, status, tips, help, etc. The user may manipulate, via a mouse input device 24, the displayed mouse pointer 56 to interact with the activatable content regions 54a, 54b, 54c, or use another input device, such as a keyboard or touch sensitive screen.

Figure 3:
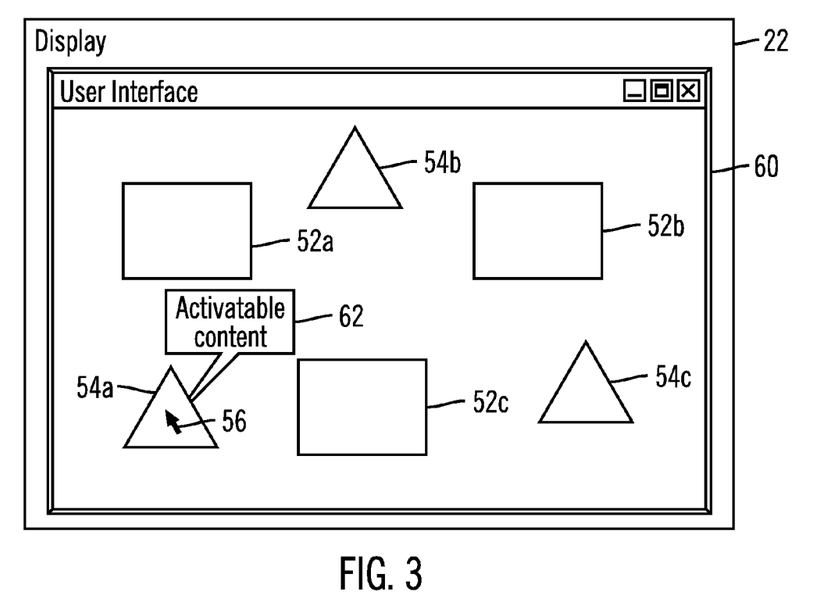

FIG. 3 illustrates an embodiment of a state of the rendered user interface 60 after the user interacts with the region 54a, such as by moving the mouse pointer 56 into the displayed region 54a, which results in the display of the activatable content 62 associated with the accessed region 54a.

Figure 4:
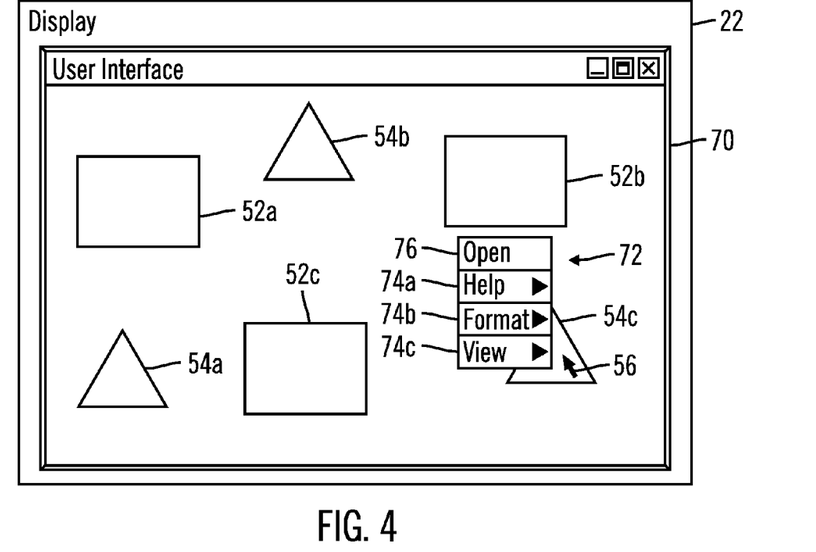

FIG. 4 illustrates an embodiment of a state of the rendered user interface 70 after the user interacts with the region 54c, such as by moving the mouse pointer 56 into the displayed region 54c, which results in the display of the activatable content 72 associated with the accessed region 54a. In FIG. 4, the activatable content 72 comprises a menu of items presenting further control and information to the user. Selection of menu items 74a, 74b, 74c provides access to further sub-menus of menu items and selection of menu item 76 activates a graphical control to perform the file "Open" operation for the user interface 12.

Figure 5:
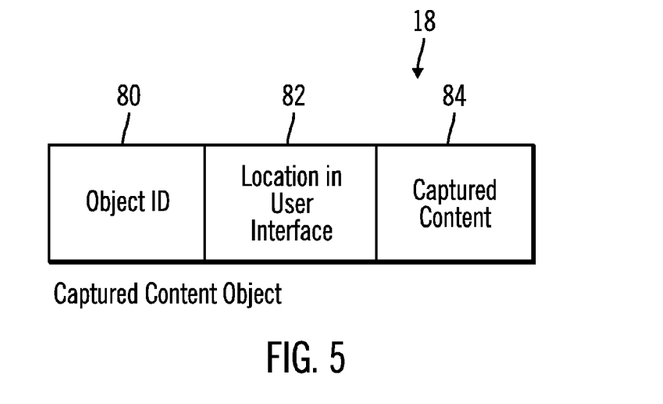
FIG. 5 illustrates an embodiment of a captured content object having captured information on user activatable content.

FIG. 5 illustrates an embodiment of an instance of a captured content object 18. The captured content object 18 includes an identifier 80, a location 82 in the rendered user interface associated with the activatable content, and captured content 84 comprising captured information on the activatable content activated in response to user interaction with respect to the location 82. The captured content 84 may comprise a captured image, such as a Joint Photographic Experts Group (JPEG) or bitmap image of the activatable content, captured text or a video or animation of the activatable content. The location 82 may comprise a region of coordinates in the rendered user interface 12 that is associated with the activatable content, such that user interaction with that region, such as by moving the mouse pointer over the region, selecting a mouse button while the mouse pointer is over the region, using keyboard commands to access the region, etc., results in the rendering of the activatable content, e.g., 62, 72 in the rendered user interface 60, 70.

Figure 6:
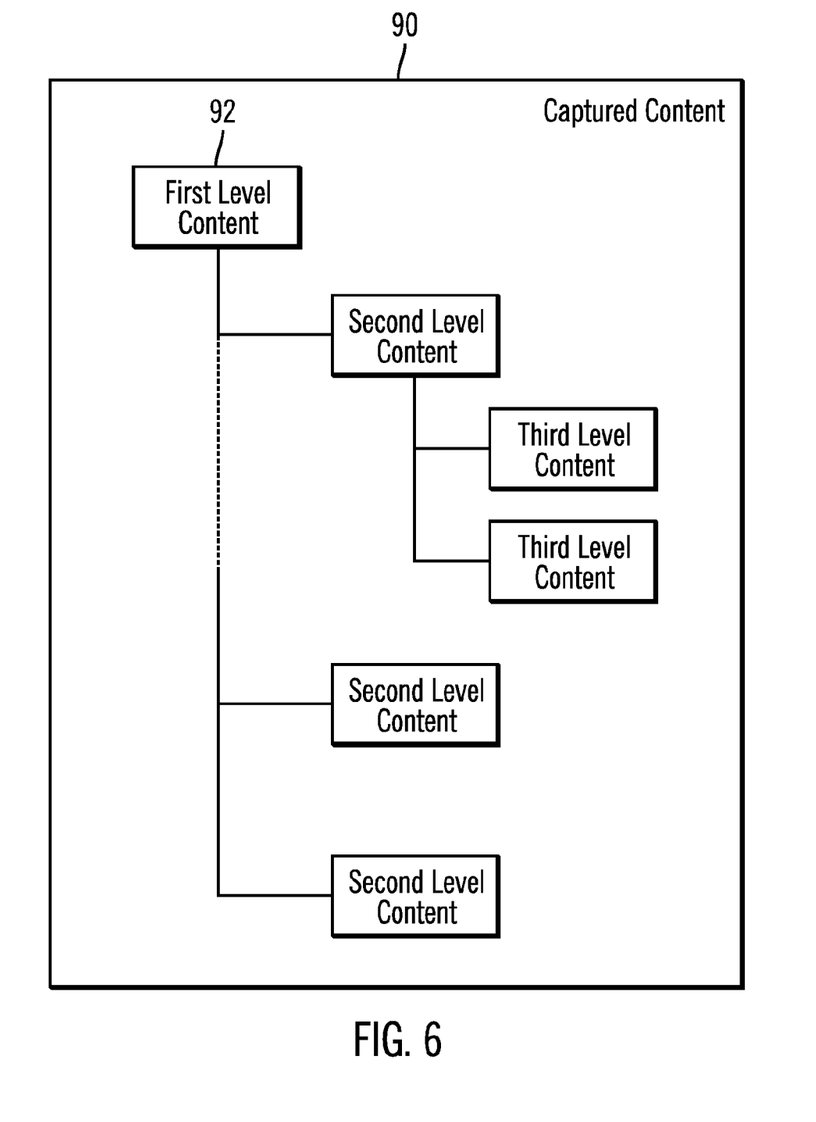
FIG. 6 illustrates an embodiment of captured content including captured content on multiple menu levels in a hierarchical menu layout.

FIG. 6 illustrates an embodiment of captured content 90 when the activatable content comprises a first level menu of items, where menu items in the first level menu may comprise a graphical control, information or access to a yet further child menu of items. Further level menus also provide either graphical controls, information, and/or access to yet further child menus. For instance, as shown in FIG. 4, menu items 74a, 74b, 74c provide access to further menus and menu item 76 provides a command to "Open" a file. In certain embodiments, the UI capture tool 8 captures an image of the menu that contains the "Open" command 76, but would not run the "Open" or command associated with the menu item. Instead, the UI capture tool 8 triggers graphical controls that provide access to further child menus. The captured content 90 includes first level content 92 comprising an image or captured information on a first level menu, e.g., 72, rendered in response to the user interacting with the region 54c in the rendered user interface 70 associated with the menu 72. The UI capture tool 8 would interact with the menu items at the first level menu to generate further menu levels rendered directly and indirectly from the first level menu and then capture content, e.g., take images, of the menus at further levels, which further level menu content is stored as second, third and any further level content items. The captured content for the first level menus and additional (second and third) level menus is stored with the captured content 90. In certain embodiments, the captured content 90 may maintain information providing the hierarchical arrangement of the menus so that the relationship of child menus, e.g., the second and third level menus, to parent menus, including the first level menu, can be determined. FIG. 6 shows the hierarchical relationship as the lines between the captured content items.

Figure 7:
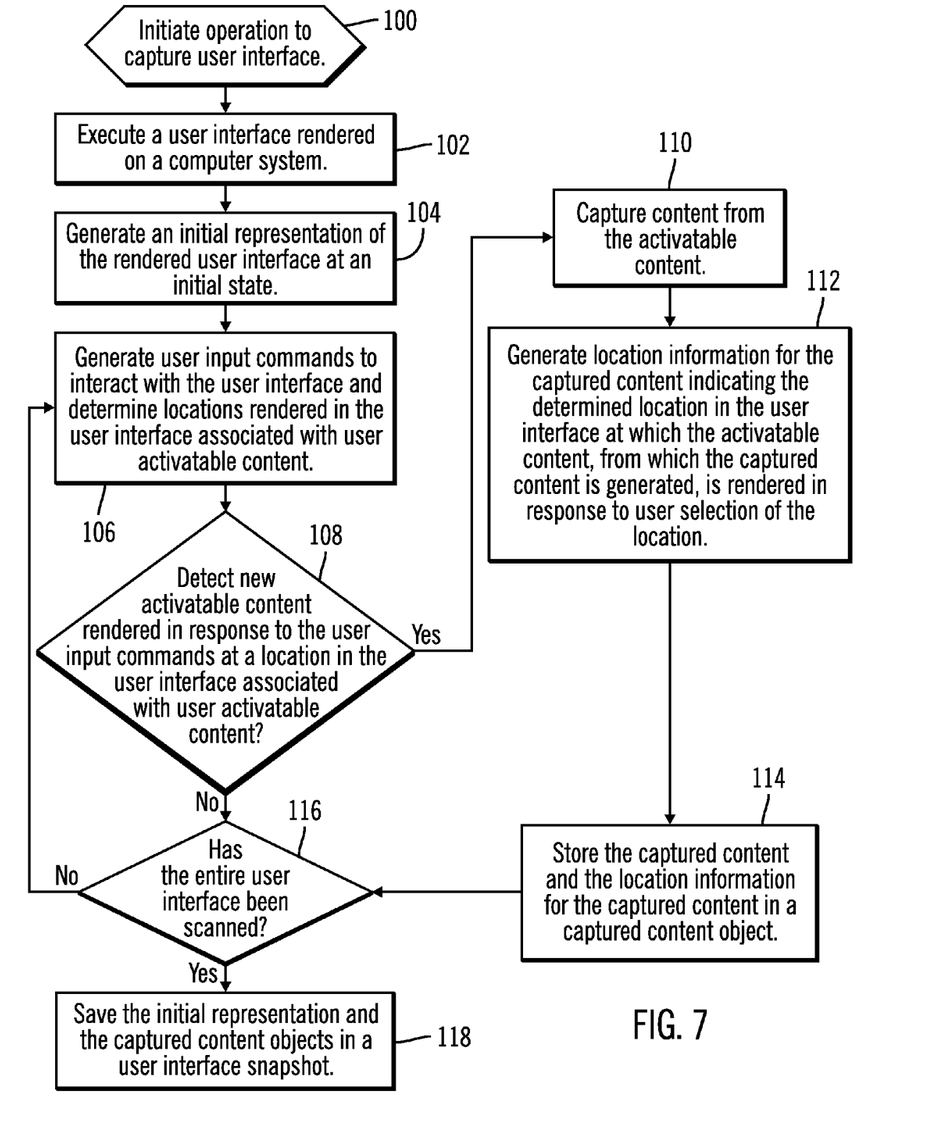
FIG. 7 illustrates an embodiment of operations to generate a user interface snapshot of the initial representation of the user interface and activatable content.

FIG. 7 illustrates an embodiment of operations performed by the UI capture tool 8 to capture content and generate a user interface snapshot 14 from the output of the user interface 12. Upon initiating (at block 100) an operation to capture the user interface 12 output, the user interface 12 is invoked and rendered (at block 102) in the computer system 2. The user interface 12 renders an initial representation of the user interface 50 (FIG. 2) at an initial state before the user selects regions 54a, 54b, 54c associated with activatable content. The UI capture tool 8 then generates (at block 104) an initial representation 18 of the rendered user interface at the initial state. In one embodiment, the initial representation 16 may comprise an image taken of the rendered user interface 50, such as a JPEG or bitmap image. In embodiments where the UI capture tool 8 can access a source file of the initial user interface, such as a Hypertext Markup Language (HTML) or Extensible Markup Language (XML) page, the initial representation 16 may comprise the source file having the code for the initial state of the user interface.

The UI capture tool 8 generates (at block 106) user input commands to interact with the user interface 12 and determine locations rendered in the user interface associated with user activatable content. The user input commands may comprise the UI capture tool 8 sending keyboard or mouse commands to the user interface 12. For instance, the commands may comprise moving a mouse pointer across the user interface 50 and selecting mouse buttons while the mouse pointer is positioned at different locations on the user interface 12. These commands are entered to cause the user interface 12 to trigger an event, such as a mouseOver event, or output in the form of the activatable content, e.g., 62 (FIG. 3), 72 (FIG. 4), which may comprise displayed text, images, video, status or a menu of further options. For instance, the UI capture tool 8 may scan the rendered user interface 50 for all touchpoints by looking for web links, tabbing to focus areas, running the mouse across the UI and scanning for mouseOver events, looking for animated GIF or embedded video, and scanning web page source and headers for ALT TEXT. This analysis may also be performed while the UI capture tool 8 simulates presses of combinations of modifier keys (Shift, Alt, etc.). Further, interactive content which is revealed by activating the found touchpoints (e.g. hierarchical menus) is scanned as it is revealed. This is recursively done to a limit specified by the user. Further, the UI capture tool 8 may issue a "right-click" mouse command on all located objects to check for context menu content. In some implementations, only menu widgets are available so objects are selected and then the menu widgets are logically pressed and the resulting text either copied or the image of the menu snapped.

In response to detecting (at block 108) activatable content rendered in response to the user input commands at a location in the user interface associated with user activatable content, such as regions 54a, 54b, 54c, the UI capture tool 8 captures (at block 110) the activatable content by generating captured content 84 (FIG. 5). The captured content 84 may comprise an image taken, e.g., JPEG, bitmap, etc., video, extracted text, etc., from the activatable content that is rendered in response to the user input commands. For instance, if the activatable content changes over time, the captured content for such changing activatable content may comprise an animated Graphics Interchange Format (GIF) or video during the capture period, such as line graphs that update, multiple messages that appear, etc.

The UI capture tool 8 further generates (at block 112) location information 82 for the captured content indicating the determined location in the rendered user interface 50 at which the activatable content, from which the captured content is generated, is rendered in response to user selection of the location. The location information 82 may indicate a region of multiple coordinates associated with one instance of activatable content if selection of the coordinates in that region 54a, 54b, 54c triggers a single activatable content. The UI capture tool 8 stores (at block 114) the captured content 84 and the location information 82 for the captured content 84 in a captured content object 18. If (at block 116) the entire rendered user interface 50 has not been scanned for activatable content, then control proceeds back to block 106 to continue to generate user input commands to interact with further regions of the rendered user interface 50 to locate new activatable content. If (at block 116) the UI capture tool 8 has scanned or checked the entire region of the rendered user interface 50, then the UI capture tool 8 saves (at block 118) the initial representation 16 and the captured content objects 18 in a user interface snapshot 14. The user interface snapshot 14 may comprise a file or object having the images of the initial representation and the captured content. Further, in embodiments where the initial representation 16 comprises a coded document, e.g., HTML, XML file, then the captured content objects 18 may be saved in the structured document to be rendered at a location approximating the location indicated in the location information 82 for the captured content 84.

Figure 8:
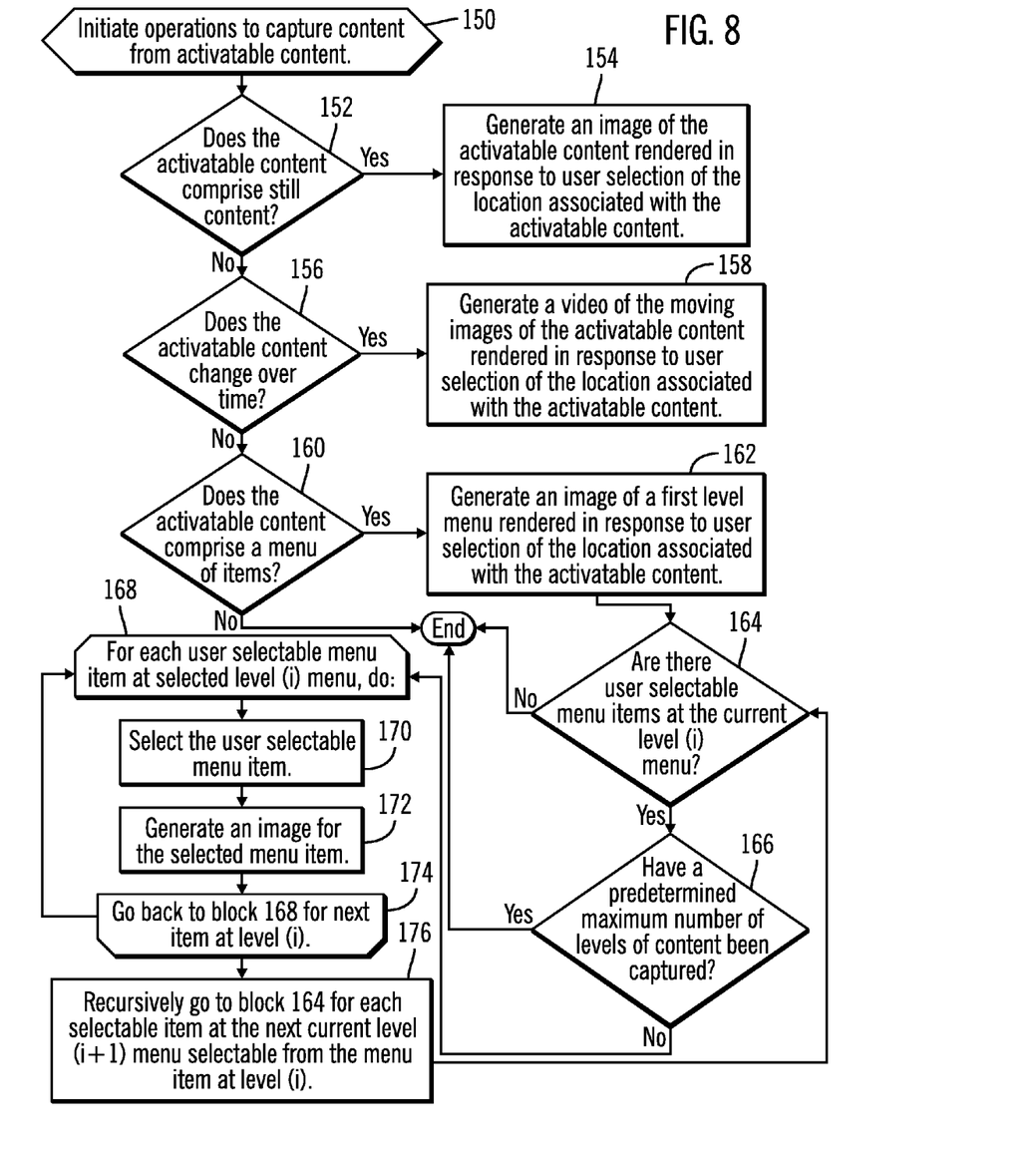
FIG. 8 illustrates an embodiment of operations to capture activatable content.

FIG. 8 illustrates an embodiment of operations performed by the UI capture tool 8 to capture activatable content depending on the type of content. Upon initiating (at block 150) a capture operation, such as at block 110 in FIG. 7, if (at block 152) the activatable content comprises still content, such as an image, text, etc., then the UI capture tool 8 generates (at block 154) an image, e.g., JPEG, bitmap, etc., of the activatable content rendered in response to user selection of the location associated with the activatable content. If (at block 156) the activatable content changes over time, such as dynamic updating content, video, graphs, numbers, text, etc., then the UI capture tool 8 generates (at block 158) a video, e.g., animated GIF, Flash® video, etc., of the moving images of the activatable content rendered in response to user selection of the location associated with the activatable content. (FLASH is a registered trademark of Adobe Corporation.). If (at block 160) the detected activatable content comprises a menu of items, then the UI capture tool 8 performs the operations at block 162-176 to capture content for each selectable menu item at the first menu level and recursively capture content for each selectable menu items accessible from any further level menus activated directly or indirectly from the selectable menu items in the first level menu.

At block 162, the UI capture tool 8 generates an image of a first level menu rendered in response to user selection of the location associated with the activatable content, which comprises the first level content 92 (FIG. 6). If (at block 164) there are user selectable menu items at the current level (i), which in the first iteration is the first level, i=1, then the UI capture tool 8 determines (at block 166) whether a predetermined maximum number of levels have been captured for a single menu. In certain embodiments, a user may specify a maximum number of menu levels for which the UI capture tool 8 will capture content. If (at block 164) the content images have been captured for the predetermined or preset number of levels, then control ends. Control further ends (from the no branch of block 164) if there are no user selectable items at the current level (i) being processed. If (from the no branch of block 166) the predetermined number of levels have not yet been captured, then the UI capture tool 8 performs a loop of operations at block 168 through block 174 for each selectable menu item at level (i) and then performs a recursive call at block 176 for each user selectable menu item at the selected level (i+1), which includes recursive calls to the user selectable menu items at each lower level. At block 164, the UI capture tool 8 is checking if the user selectable menu items reveal sub or child menus. The UI capture tool 8 does not perform the actual action associated with a menu item, but instead captures the display of the submenus. Leaf or menu item actions that do not cascade to reveal sub-menus will not be selected for further analysis.

For each selectable menu item at the selected level (i) menu the UI capture tool 8 selects (at block 170) the user selectable menu item to cause the next level of content or menu to be selected and generates (at block 172) an image for the selected menu item that is rendered. Control then proceeds (at block 174) back to block 168 for the next selectable menu item at level (i) after stopping completing processing for one selectable menu item and any menus and items directly or indirectly accessed through that item. After completing processing of all the selectable menu items at the first level, then the UI capture tool 8 recursively goes (at block 176) to block 164 for the each next level (i+1) menu items accessible from the selected menu item at level (i) to process all selected menu items from the menu at the next level (i+1). FIG. 6 illustrates how the content captured for menus at different levels maybe stored in the captured content 90.

Figure 9:
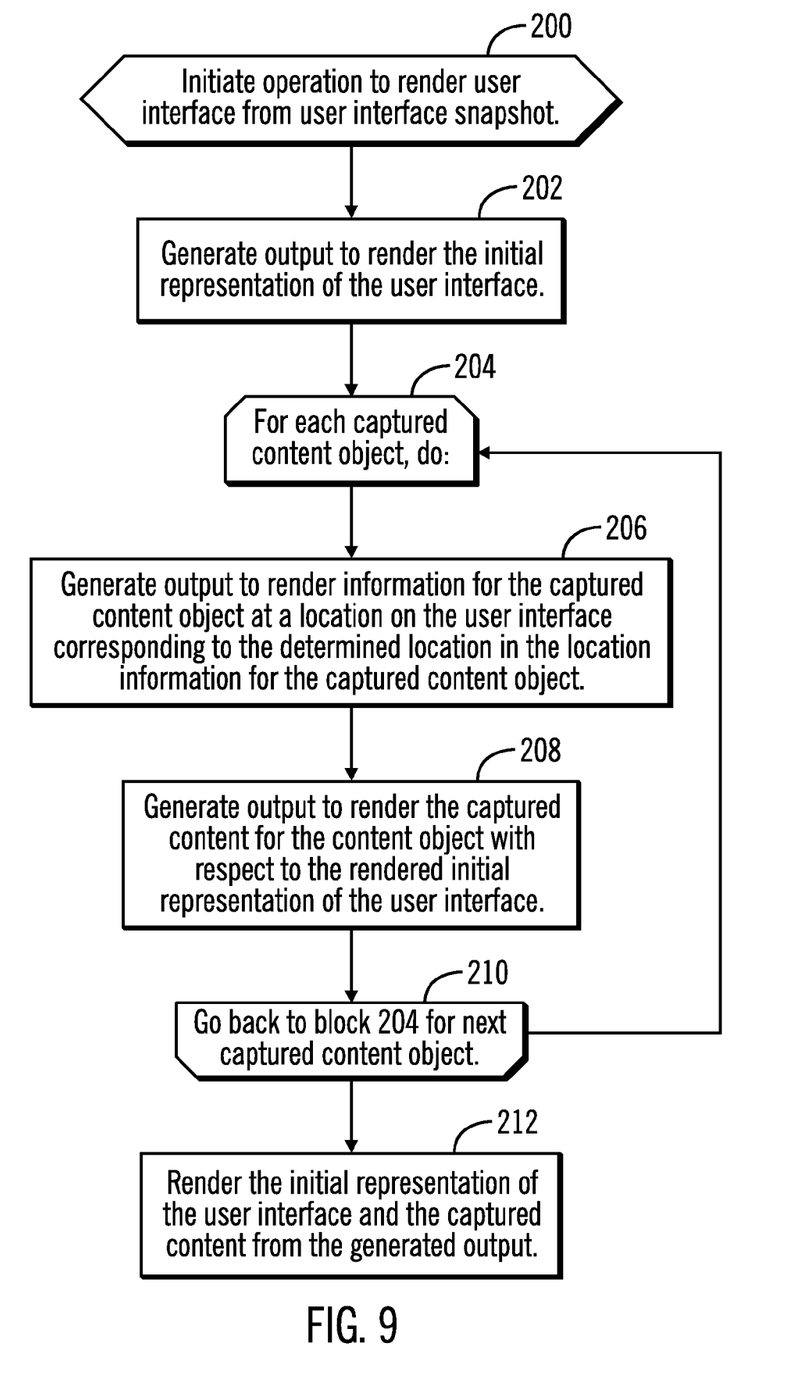
FIG. 9 illustrates an embodiment of operations to render a representation of the user interface from the user interface snapshot.

FIG. 9 illustrates an embodiment of operations performed by the UI capture tool 8 to render a representation of the user interface from a user interface snapshot 14. Upon initiating (at block 200) an operation to render a representation of the user interface from the user interface snapshot 14, the UI capture tool 8 generates (at block 202) output to render the initial representation 16 of the user interface. The UI capture tool 8 further performs a loop of operations at blocks 204-210 to render the content for each captured content object 18. At block 206, output is generated to render information for the captured content object at a location on the user interface corresponding to the determined location in the location information for the captured content object. At block 208, output is generated to render the captured content 84 for the content object 82 with respect to the rendered initial representation of the user interface. The rendered output may comprise static or dynamic content based on a quality of the snapshot output. After generating the output for all the content objects, the UI capture tool 8 renders (at block 212) the initial representation of the user interface and the captured content from the generated output.

For instance, in one embodiment where the initial representation and the captured content all comprise images, then the initial representation of the user interface 12 is rendered as an image and the captured content images are rendered overlaid or superimposed over the initial representation in the same view. In such case, the rendered information at the location on the user interface corresponding to the determined location in the location information comprises the content image superimposed at a location in the rendered user interface corresponding to the determined location. If the capture content comprises video, then a video window, in which the video content is rendered, may be superimposed at the location corresponding to the determined location which resulted in the video content. In a further embodiment, the initial representation and captured content images may be layered images so that applications can show and hide layers. In a further embodiment, the initial representation may be overlaid with reference numbers at the location on the user interface corresponding to the determined location in the location information for the captured content objects and the actual content objects may be presented below the initial representation referenced with the reference numbers added to the initial representations. The reference numbers on the rendered user initial representation may comprise hyper links that direct the user to the captured content.

In an image map type output, the initial representation image is added to a structured document with codes, such as an HTML or XML document, and the captured content are added as links to the initial representation image so that as items are selected, the captured content images are displayed.

In a yet further embodiment, if the initial representation 16 comprises source code of the presentation, such as an HTML or XML page, then the additional captured content images are added to the source code page with location information associating the captured content with the determined location in the user interface at which the captured content was activated. The result is an approximation of the real UI where the snapshot in time of the objects, column properties, etc. The captured content may be rendered from this source code file of the initial representation using links or other graphical controls. In a further embodiment, the captured content objects 18 can be rendered from the user interface snapshot 14 using a mouse-over or other graphical controls that caused the captured content to be displayed during the capture operations of FIGS. 7 and 8. Rendering the captured content in a similar manner as the content was rendered in the user interface 12 provides closer approximation to the behavior of the user interface 12 being analyzed. For instance, if, in the initial user interface 12, moving a mouse over an icon resulted in a presentation of user interface content, then the approximation capture could reveal the captured content 84 (FIG. 5) only when the user mouses over the location in the initial representation 16.

Figure 10:
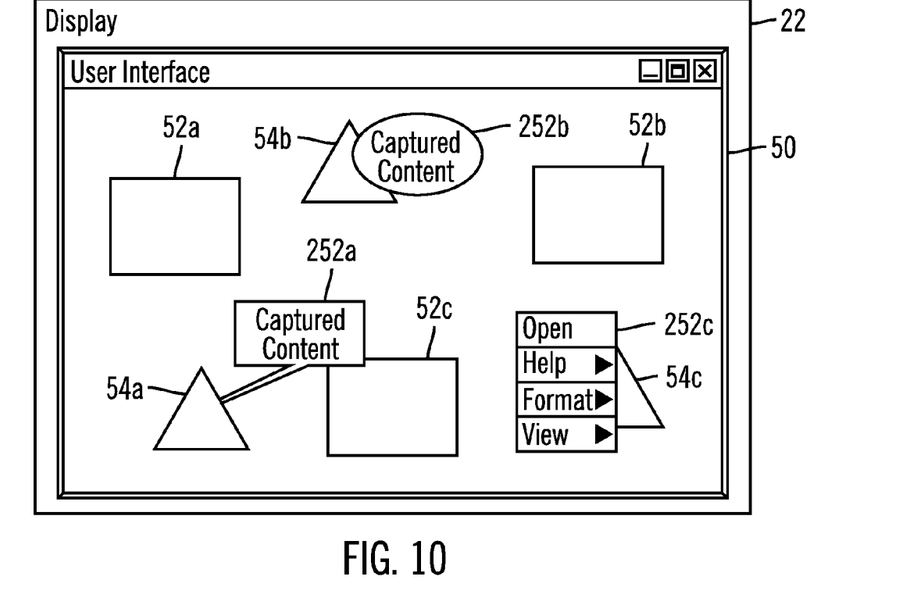
FIG. 10 illustrates an embodiment of a user interface rendered from a user interface snapshot.

FIG. 10 illustrates an embodiment of the rendered representation of the user interface from the user interface snapshot 15. The initial representation 250 is rendered along with captured content 252a, 252b, and 252c from the initial representation 16 and captured content objects 18 in the user interface snapshot 14.

The rendered representation of the user interface 200 may be used to provide technical support to troubleshoot problems a user is experiencing with the user interface 12 and application 10. For instance, a technical support team may provide the user with the UI capture tool 8 to deploy to generate a user interface snapshot 14, which the user then sends to the technical support team, such as by transmitting over a network or the Internet. The technical support team may then generate the user interface the user previously rendered to troubleshoot problems the user is experiencing and report troubleshooting information back to the user over the network, Internet or according to a cloud computing model. Further, if the user interface provides status on components or systems, such as a single system or a network of components, then the user interface snapshot 14 may be provided to the administrator or support team to determine the status of a system or network by rendering the user interface snapshot to present the user interface status on the components of the system or network.

Described embodiments provide techniques to capture an initial representation of a user interface and activatable content that is activated in response to the user interacting with the user interfaces. The captured initial representation and activatable content may be saved in a user interface snapshot that may be processed to render a representation of the initial user interface and activatable content that may be accessed through the user interface.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). (Java is a registered trademark of Oracle Corporation and Smalltalk is a registered trademark of Cincom Systems, Inc.)

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 7-9 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for gathering information on a user interface, the computer program product comprising a computer readable storage medium having computer readable program code embodied therein that executes to perform operations within a computer system, the operations comprising:

executing a user interface on the computer system;

generating an initial representation of a rendered user interface;

determining locations rendered in the user interface associated with user activatable content, wherein the user interface renders the user activatable content in response to user selection of the determined locations associated with the user activatable content, wherein the determined locations comprise regions of coordinates in the rendered interface;

determining whether the user activatable content is detected at the determined locations;

capturing a representation of the user activatable content detected at the determined locations;

generating a captured content object for each instance of capturing the representation of the detected user activatable content;

saving the captured content objects and the initial representation; and processing the initial representation and the captured content objects to generate output to render the initial representation of the user interface and the representations of the user activatable content in the captured content objects, wherein the captured representations of the user activatable content are rendered superimposed on the initial representation with respect to the determined locations for the captured representations of the user activatable content in the user interface.

2. The computer program product of claim 1, wherein the operations further comprise:

generating location information for the captured content objects indicating the determined location in the user interface at which the user activatable content, from which the captured content is generated, is rendered in response to the user selection of the location in the user interface associated with the user activatable content; and saving the location information for the captured content objects.

3. The computer program product of claim 2, wherein the processing the initial representation and the captured content objects to render the output representation of the user interface comprises:

rendering an indication, for each captured content object, on the initial representation based on the determined location in the location information for the captured content object; and rendering the captured content with the rendering of the initial representation.

4. The computer program product of claim 1, wherein the determining of the locations rendered in the user interface associated with user activatable content comprises:

generating user input commands to interact with the user interface; and detecting the user activatable content rendered in response to the user input commands interacting with the user interface, wherein the captured content object is generated in response to detecting the rendered user activatable content.

5. The computer program product of claim 1, wherein the user activatable content comprises a first level menu, and wherein the generating the captured content object comprises:

capturing content from the first level menu associated with the determined location to generate first level captured content;

interacting with the first level menu to render at least one further level of the user activatable content; and capturing content from the at least one further level of the user activatable content to generate further level captured content, wherein the first level captured content and further level captured content are stored in the captured content object for the user activatable content having the first level menu.

6. The computer program product of claim 1, wherein the user activatable content comprises a first level menu, and wherein the generating the captured content object comprises:

capturing content from the first level menu associated with the determined location to generate first level captured content;

processing a setting indicating a number of content levels to process; and recursively processing menus activated from the first level menu and further menus directly or indirectly activated through the first level menu to generate further level captured content up to the number of menu levels indicated in the setting.

7. The computer program product of claim 1, wherein generating the initial representation of the user interface comprises capturing an image of the rendered user interface, wherein the generating the captured content comprises capturing an image of the user activatable content and including the captured image in the captured content object, and wherein the rendering the representation of the user interface and the captured content comprises rendering the captured images with respect to the image of the initial representation of the user interface.

8. The computer program product of claim 1, wherein the initial representation comprises a document including code used to generate the user interface, wherein the saving the captured content objects comprises including the captured content in the captured content object in the initial representation document to provide information on the user activatable content at the determined locations, and wherein the processing the initial representation and the content objects comprises processing the code in the initial representation to render information on the user interface and the user activatable content.

9. The computer program product of claim 1, wherein the operations further comprise:

scanning, by a user interface capture tool, the user interface to perform the determining the locations having the user activatable content; and generating commands, by the user interface capture tool, to perform the determining whether the user activatable content is detected and generating the captured content objects.

10. A system program product for gathering information on a user interface, comprising:

a processor; and a computer readable storage medium having code executed by the processor to perform operations, the operations comprising:

executing a user interface;

generating an initial representation of a rendered user interface;

determining locations rendered in the user interface associated with user activatable content, wherein the user interface renders the user activatable content in response to user selection of the determined locations associated with the user activatable content, wherein the determined locations comprise regions of coordinates in the rendered interface;

determining whether the user activatable content is detected at the determined locations;

capturing a representation of the activatable content detected at the determined locations;

generating a captured content object for each instance of capturing the representation of the detected user activatable content;

saving the captured content objects and the initial representation; and processing the initial representation and the captured content objects to generate output to render the initial representation of the user interface and the representations of the user activatable content in the captured content objects, wherein the captured representations of the user activatable content are superimposed on the initial representation with respect to the determined locations for the captured representations of the user activatable content in the user interface.

11. The system of claim 10, wherein the operations further comprise:

generating location information for the captured content objects indicating the determined location in the user interface at which the user activatable content, from which the captured content is generated, is rendered in response to the user selection of the location in the user interface associated with the user activatable content; and saving the location information for the captured content objects.

12. The system of claim 11, wherein the processing the initial representation and the captured content objects to render the output representation of the user interface comprises:

rendering an indication, for each captured content object, on the initial representation based on the determined location in the location information for the captured content object; and rendering the captured content with the rendering of the initial representation.

13. The system of claim 10, wherein the determining of the locations rendered in the user interface associated with user activatable content comprises:

generating user input commands to interact with the user interface; and detecting the user activatable content rendered in response to the user input commands interacting with the user interface, wherein the captured content object is generated in response to detecting the rendered user activatable content.

14. The system of claim 10, wherein the user activatable content comprises a first level menu, and wherein the generating the captured content object comprises:

capturing content from the first level menu associated with the determined location to generate first level captured content;

processing a setting indicating a number of content levels to process; and recursively processing menus activated from the first level menu and further menus directly or indirectly activated through the first level menu to generate further level captured content up to the number of menu levels indicated in the setting.

15. The system of claim 10, wherein the initial representation comprises a document including code used to generate the user interface, wherein the saving the captured content objects comprises including the captured content in the captured content object in the initial representation document to provide information on the user activatable content at the determined locations, and wherein the processing the initial representation and the content objects comprises processing the code in the initial representation to render information on the user interface and the user activatable content.

16. The system of claim 10, wherein the operations further comprise:

scanning, by a user interface capture tool, the user interface to perform the determining the locations having the user activatable content; and generating commands, by the user interface capture tool, to perform the determining whether the user activatable content is detected and generating the captured content objects.

17. A method implemented in a computer system for gathering information on a user interface executing in the computer system, comprising:

executing a user interface on the computer system;

generating an initial representation of a rendered user interface;

determining locations rendered in the user interface associated with user activatable content, wherein the user interface renders the user activatable content in response to user selection of the determined locations associated with the user activatable content, wherein the determined locations comprise regions of coordinates in the rendered interface;

determining whether the user activatable content is detected at the determined locations;

capturing a representation of the user activatable content detected at the determined locations;

generating a captured content object for each instance of capturing the representation of the detected user activatable content;

saving the captured content objects and the initial representation; and processing the initial representation and the captured content objects to generate output to render the initial representation of the user interface and the representations of the user activatable content in the captured content objects, wherein the captured representations of the user activatable content are superimposed on the initial representation with respect to the determined locations for the captured representations of the user activatable content in the user interface.

18. The method of claim 17, wherein the operations further comprise:

generating location information for the captured content objects indicating the determined location in the user interface at which the user activatable content, from which the captured content is generated, is rendered in response to the user selection of the location in the user interface associated with the user activatable content; and saving the location information for the captured content objects.

19. The method of claim 18, wherein the processing the initial representation and the captured content objects to render the output representation of the user interface comprises:

rendering an indication, for each captured content object, on the initial representation based on the determined location in the location information for the captured content object; and rendering the captured content with the rendering of the initial representation.

20. The method of claim 17, wherein the determining of the locations rendered in the user interface associated with user activatable content comprises:

generating user input commands to interact with the user interface; and detecting the user activatable content rendered in response to the user input commands interacting with the user interface, wherein the captured content object is generated in response to detecting the rendered user activatable content.

21. The method of claim 17, wherein the user activatable content comprises a first level menu, and wherein the generating the captured content object comprises:
- capturing content from the first level menu associated with the determined location to generate first level captured content;
- processing a setting indicating a number of content levels to process; and
- recursively processing menus activated from the first level menu and further menus directly or indirectly activated through the first level menu to generate further level captured content up to the number of menu levels indicated in the setting.

22. The method of claim 17, further comprising:
- scanning, by a user interface capture tool, the user interface to perform the determining the locations having the user activatable content; and
- generating commands, by the user interface capture tool, to perform the determining whether the user activatable content is detected and generating the captured content objects.

* * * * *